(12) United States Patent
Xu

(10) Patent No.: US 10,422,153 B2
(45) Date of Patent: Sep. 24, 2019

(54) JOINT MECHANISM FOR AN IRON-MADE TENT

(71) Applicant: Xinjian Xu, Jinhua (CN)

(72) Inventor: Xinjian Xu, Jinhua (CN)

( * ) Notice: Subject to any disclaimer, the term of this patent is extended or adjusted under 35 U.S.C. 154(b) by 413 days.

(21) Appl. No.: 15/184,637

(22) Filed: Jun. 16, 2016

(65) Prior Publication Data

US 2017/0260770 A1 Sep. 14, 2017

(30) Foreign Application Priority Data

Mar. 10, 2016 (CN) .................... 2016 2 0181339 U

(51) Int. Cl.
*E04B 1/19* (2006.01)
*E04H 15/44* (2006.01)
*F16B 7/04* (2006.01)

(52) U.S. Cl.
CPC ........... *E04H 15/44* (2013.01); *E04B 1/1903* (2013.01); *E04B 2001/1924* (2013.01); *F16B 7/0413* (2013.01); *Y10T 403/30* (2015.01); *Y10T 403/61* (2015.01)

(58) Field of Classification Search
CPC ..... E04B 2001/1918; E04B 2001/1921; E04B 2001/1924; E04B 2001/1936; E04B 2001/2409; E04B 2001/2412; E04B 1/1903; E04B 2001/1966; E04B 2001/2454; E04H 15/44; F16B 7/00; F16B 5/0052; Y10T 403/30; Y10T 403/4645; Y10T 403/61
See application file for complete search history.

(56) References Cited

U.S. PATENT DOCUMENTS

| | | | | |
|---|---|---|---|---|
| 2,764,107 A | * | 9/1956 | Niswonger | E04B 1/34326 52/643 |
| 2,793,407 A | * | 5/1957 | Johnston | F16B 12/20 403/182 |
| 3,563,581 A | * | 2/1971 | Sommerstein | E04B 1/1912 403/217 |
| 3,683,429 A | * | 8/1972 | Mis | A47C 19/024 5/201 |
| 3,685,866 A | * | 8/1972 | Patenaude | E04B 1/2403 403/189 |
| 4,171,173 A | * | 10/1979 | Hymans | E04B 1/215 403/189 |
| 4,512,117 A | * | 4/1985 | Lange | E04H 3/10 403/331 |
| 4,948,289 A | * | 8/1990 | Dellinger | E04H 15/58 403/246 |

(Continued)

*Primary Examiner* — Matthew R McMahon
(74) *Attorney, Agent, or Firm* — Wang Law Firm, Inc.

(57) ABSTRACT

A mechanism for connecting two beams comprises a left beam and a right beam. The left beam is formed by an upper cross bar, a lower cross bar, and a vertical plate, the vertical plate has a width greater than a width of the upper cross bar and a width of the lower cross bar, the vertical plate has two edges protruding laterally away from the upper cross bar and the lower cross bar; the right beam has a vertical socket for receiving the vertical plate, the vertical socket is connected to the upper cross bar and to the lower cross bar, the vertical socket has two opposing curled lateral edges protruding laterally away from the upper cross bar and the lower cross bar, the two protruding edges of the vertical plate are inserted between the two opposite curled edges of the vertical socket.

2 Claims, 4 Drawing Sheets

(56) References Cited

U.S. PATENT DOCUMENTS

| | | | | | |
|---|---|---|---|---|---|
| 5,061,111 | A | * | 10/1991 | Hosokawa | E04B 1/2604 403/187 |
| 5,163,642 | A | * | 11/1992 | Torrens | F16L 3/00 248/49 |
| 5,244,300 | A | * | 9/1993 | Perreira | E04B 1/2403 403/381 |
| 5,927,363 | A | * | 7/1999 | Olsen | E04F 10/02 135/116 |
| 6,923,195 | B2 | * | 8/2005 | Tseng | E04C 3/32 135/122 |
| 7,941,985 | B2 | * | 5/2011 | Simmons | E04B 1/24 52/655.1 |
| 8,209,925 | B2 | * | 7/2012 | Foley | E04B 1/2403 403/403 |
| 8,365,479 | B2 | * | 2/2013 | Tucker | F24S 25/65 52/173.3 |
| 9,243,422 | B2 | * | 1/2016 | Hunt | E04H 15/18 |
| 9,556,639 | B2 | * | 1/2017 | Hunt | E04H 15/16 |
| 10,132,075 | B2 | * | 11/2018 | Banal | E04B 1/34321 |
| 2007/0215191 | A1 | * | 9/2007 | Huang | E04H 15/44 135/131 |
| 2008/0053032 | A1 | * | 3/2008 | Hockemeyer | E04B 7/024 52/651.07 |
| 2013/0145719 | A1 | * | 6/2013 | Tseng | E04H 15/44 52/653.1 |

* cited by examiner

JOINT MECHANISM FOR AN IRON-MADE TENT

RELATE APPLICATIONS

This application claims benefit to Chinese Patent Application 201620181339.0, filed on Mar. 10, 2016, the specification of which is incorporated herein by this reference.

FIELD OF THE INVENTION

The present invention relates to a mechanism for connecting two beams.

DESCRIPTION OF THE PRIOR ART

In the prior art, most tents have a one-button quick-disassembly mechanism by which a tent can be quickly assembled or disassembled. However, such a quick-disassembly mechanism is used usually in small tents, and seldom in large tents due to limited strength of the quick-disassembly structure. In large tents, the connection between columns and beams is generally realized by connecting ends to sleeves. Such a connection way is labor-consuming in assembling since one connection joint is to be screwed with at least three support rods, and is thus unable to realize quick assembly and disassembly of large tents. In addition, due to the lack of an appropriate splicing mechanism, common tubes or rods are generally used as beams. Such a structure is at a disadvantage for splicing and storage.

SUMMARY OF THE INVENTION

A technical problem to be solved by the present invention is, in view of the prior art, to provide a mechanism for connecting two beams. This mechanism can realize quick assembly and disassembly of beams, and facilitate the storage and transportation thereof.

To solve this technical problem, the mechanism for connecting two beams comprises a left beam formed by an upper cross bar with a first end, a lower cross bar with a second end, and a vertical plate connected to the first end of the upper cross bar and to the second end of the lower cross bar, the vertical plate having a width greater than a width of the upper cross bar and a width of the lower cross bar, the vertical plate having two edges protruding laterally away from the upper cross bar and the lower cross bar; and a right beam formed by an upper cross bar with a third end, a lower cross bar with a fourth end, and a vertical socket for receiving the vertical plate, the vertical socket being connected to the third end of the upper cross bar and to the fourth end of the lower cross bar, the vertical socket having two opposing curled lateral edges protruding laterally away from the upper cross bar and the lower cross bar, wherein, the two protruding edges of the vertical plate are inserted between the two opposite curled edges of the vertical socket.

Preferably, the vertical plate and the vertical socket are respectively connected to the corresponding upper cross bar and lower cross bar by bolts.

Preferably, a first mounting hole formed on the upper cross bar of the left beam and a second mounting hole formed on the upper cross bard of the right beam.

Preferably, a block protruding outside is provided at the bottom of the vertical socket for stopping the vertical plate.

Compared with the prior art, in the present invention, the mechanism for connecting two beams of the present invention can realize quick assembly and disassembly; and meanwhile, under this mechanism, a beam is very firm after being connected, and thus applicable to large tents.

DETAILED DESCRIPTION OF THE PREFERRED EMBODIMENT

Figure 1:
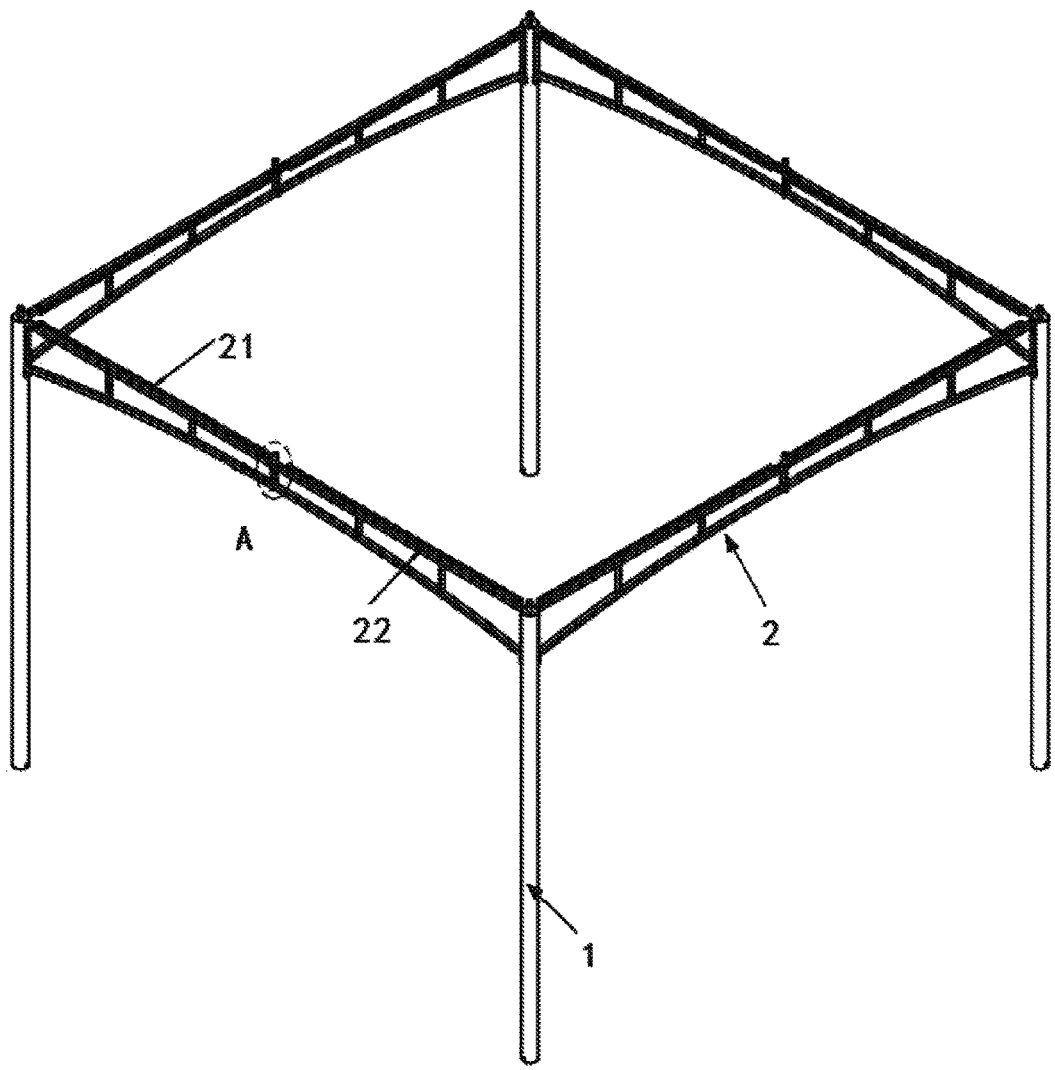
FIG. 1 is a perspective view of a mechanism for connecting two beams according to the embodiment of the present invention used in a supporting frame of an iron tent.

To enable a further understanding of the present invention content of the invention herein, refer to the detailed description of the invention and the accompanying drawings below:

As shown in FIG. 1, a mechanism for connecting two beams used in a tent, comprises four columns 1 and four beams 2; each beam 2 is disposed across at the top of the two adjacent columns 1; the four beams 2 are arranged in a rectangle, and each beam 2 comprises a left beam 21 and a right beam 22.

Figure 2:
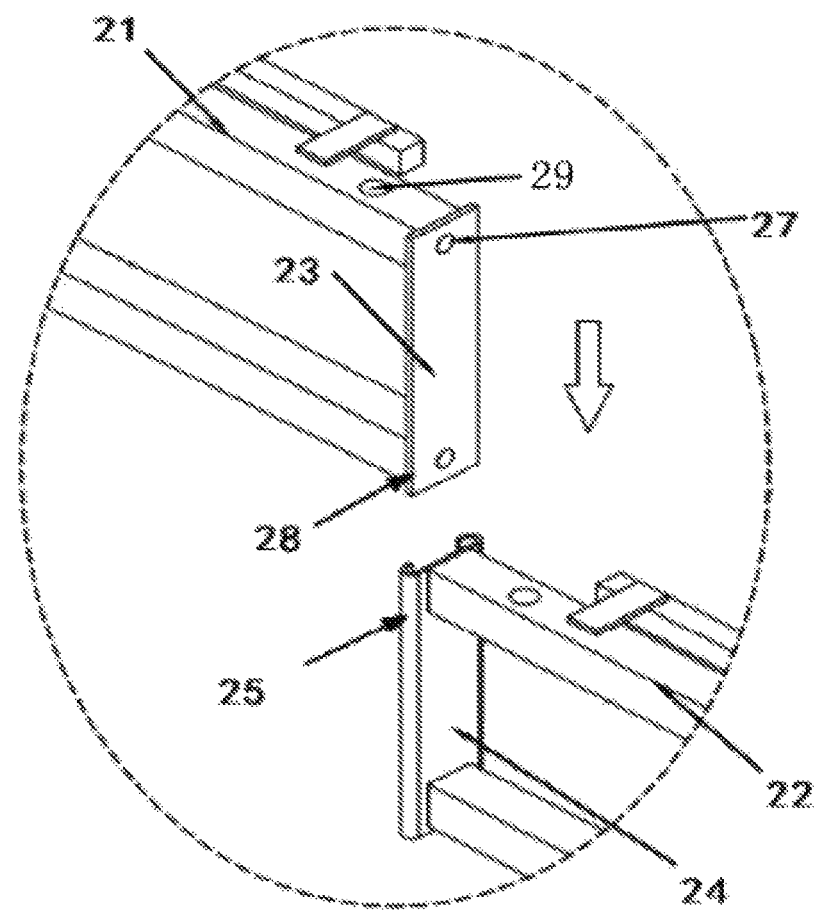
FIG. 2 is an exploded view of the Part-A of FIG. 1.

The mechanism for connecting of the left beam 21 and the right beam 22 is shown in FIG. 2. The left beam 21 formed by an upper cross bar with a first end, a lower cross bar with a second end, and a vertical plate 23 connected to the first end of the upper cross bar and to the second end of the lower cross bar, the vertical plate 23 having a width greater than a width of the upper cross bar and a width of the lower cross bar, the vertical plate 23 having two edges protruding laterally away from the upper cross bar and the lower cross bar; and a right beam 22 formed by an upper cross bar with a third end, a lower cross bar with a fourth end, and a vertical socket 24 for receiving the vertical plate 23, the vertical socket 24 being connected to the third end of the upper cross bar and to the fourth end of the lower cross bar, the vertical socket 24 having two opposing curled lateral edges 25 protruding laterally away from the upper cross bar and the lower cross bar, wherein, the two protruding edges 28 of the vertical plate 23 are inserted between the two opposite curled edges 25 of the vertical socket 24. Bolt holes 27 are formed on the vertical plate 23 and the vertical socket 24, and the vertical plate and the vertical socket 24 are fixedly connected to a corresponding beam by bolts into the bolt holes 27.

And a block 24a protruding outside is provided at the bottom of the vertical socket 24 for stopping the vertical plate 23, in order to prevent the vertical plate 23 from falling down from the vertical socket 24.

With regard to the beam of the invention, the splicing can be realized by inserting the pin of the left beam inserted into the pin socket of the right beam from the top down; and when in disassembly, this operation is performed reversely.

Figure 3:
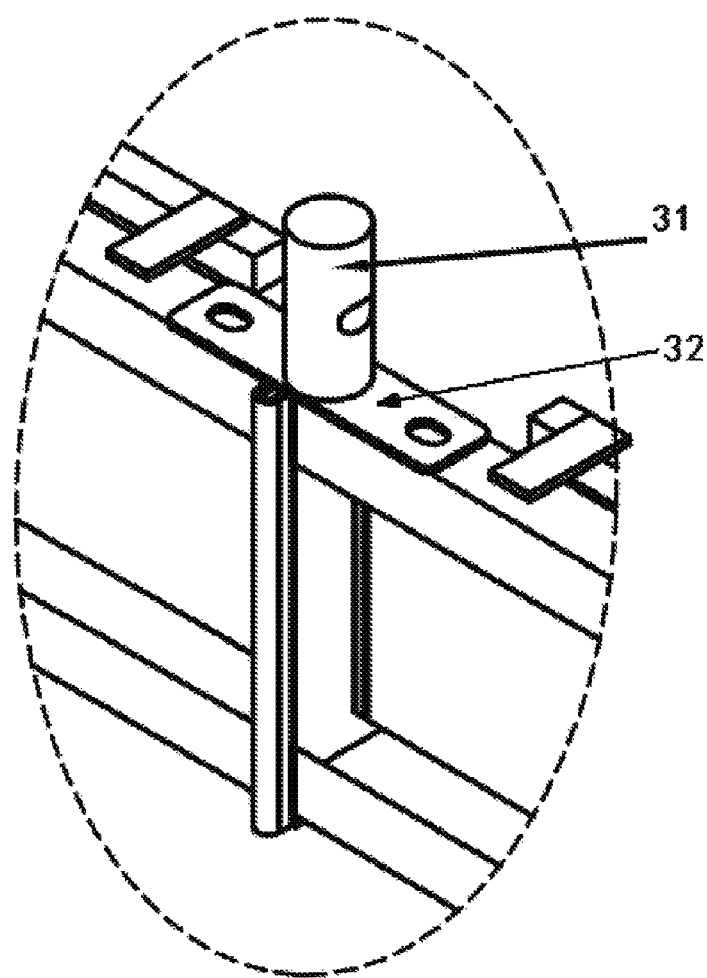
FIG. 3 is a perspective view of the Part-A of FIG. 1 showing a top tube mounted on the beam.
Figure 4:
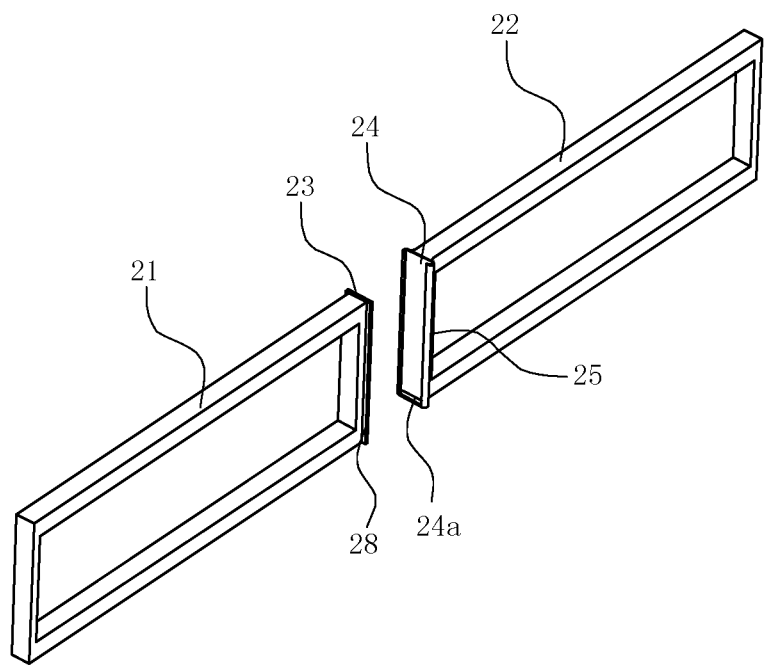
FIG. 4 is another exploded view of the left beam and the right beam of the mechanism for connecting two beams according to the embodiment of the present invention.

A mounting hole 29 for a top tube is formed on the upper cross bar of the left beam or the right beam. The mounting hole 29 for a top tube is configured to mount a top tube mechanism. As shown in FIG. 3, the top tube mechanism includes a top tube 31 and a securing sheet 32; bolt holes corresponding to the mounting hole 29 for a top tube are formed on two sides of the securing sheet 32; and the top tube mechanism is fixed onto the beam after bolts into the bolt holes.

It will be understood by those skilled in the art that various modifications, changes and combinations can be made to the implementations as described above without departing from the protect scope of the present invention, and those modifications, changes and combinations shall be regarded as falling into the scope of the inventive concept.

The invention claimed is:

1. A mechanism for connecting two beams, comprising:
a left beam formed by an upper cross bar with a first end, a lower cross bar with a second end, and a vertical plate connected to the first end of the upper cross bar and to the second end of the lower cross bar, the vertical plate having a width greater than a width of the upper cross bar and a width of the lower cross bar, the vertical plate having two edges protruding laterally away from the upper cross bar and the lower cross bar; and
a right beam formed by an upper cross bar with a third end, a lower cross bar with a fourth end, and a vertical socket for receiving the vertical plate, the vertical socket being connected to the third end of the upper cross bar and to the fourth end of the lower cross bar, the vertical socket having two opposing curled lateral edges protruding laterally away from the upper cross bar and the lower cross bar,
a first mounting hole formed on the upper cross bar of the left beam and a second mounting hole formed on the upper cross bar of the right beam, the first and second mounting holes being configured to receive a top tube mechanism,
wherein, the two protruding edges of the vertical plate are inserted between the two opposite curled edges of the vertical socket, and a block protruding outside is provided at a bottom of the vertical socket for stopping the vertical plate
the top tube mechanism comprises a top tube and a rectangular securing sheet, the securing sheet having a first and a second bolt hole corresponding to the first mounting hole and the second mounting hole, respectively, the first and second bolt holes being formed on opposite ends of the securing sheet, the top tube mechanism being fixed onto each of the beams by bolts inserted into each bolt hole and the corresponding mounting hole.

2. The mechanism of claim 1, wherein the vertical plate and the vertical socket are respectively connected to the corresponding upper cross bar and lower cross bar by bolts.

* * * * *